(12) United States Patent
Trapp et al.

(10) Patent No.: US 8,895,887 B2
(45) Date of Patent: Nov. 25, 2014

(54) RESISTANCE WELD REPAIRING OF CASING FLANGE HOLES

(75) Inventors: Timothy Joseph Trapp, Cincinnati, OH (US); Manish Deepak Dighe, West Chester, OH (US); Gregory Christopher Firestone, Pickerington, OH (US)

(73) Assignee: General Electric Company, Schenectady, NY (US)

( * ) Notice: Subject to any disclaimer, the term of this patent is extended or adjusted under 35 U.S.C. 154(b) by 600 days.

(21) Appl. No.: 13/204,084

(22) Filed: Aug. 5, 2011

(65) Prior Publication Data

US 2013/0032578 A1 Feb. 7, 2013

(51) Int. Cl.
| | |
|---|---|
| *B23K 11/00* | (2006.01) |
| *B23P 6/00* | (2006.01) |
| *B21J 13/08* | (2006.01) |
| *B23K 11/11* | (2006.01) |
| *F01D 5/00* | (2006.01) |

(52) U.S. Cl.
CPC ............. *B23K 11/004* (2013.01); *B23K 11/115* (2013.01); *B23K 11/002* (2013.01); *B23K 11/0013* (2013.01); *F05D 2230/232* (2013.01); *B23K 2201/001* (2013.01); *B23P 6/007* (2013.01); *F05D 2240/14* (2013.01); *F01D 5/005* (2013.01)
USPC ..... 219/78.01; 29/889; 29/402.13; 219/117.1

(58) Field of Classification Search
CPC ....................................................... B23B 35/00
USPC ................. 219/117.1, 118, 120, 111; 29/889; 408/1 R
See application file for complete search history.

(56) References Cited

U.S. PATENT DOCUMENTS 1,784,015 A * 12/1930 Lane et al. ....................... 219/77
1,933,938 A * 11/1933 Schnetzer ...................... 219/120

(Continued)

FOREIGN PATENT DOCUMENTS

| EP | 0470868 A1 | 2/1992 | |
| JP | 63104788 A * | 5/1988 | ............. B23K 11/22 |

OTHER PUBLICATIONS

"Martensite and Retained Austenite", George F. Vander Voort—Buehler Ltd., Lake Bluff, Ill., IndustrialHeating.com—Apr. 2009, beginning on p. 51.

(Continued)

*Primary Examiner* — Henry Yuen
*Assistant Examiner* — Jimmy Chou
(74) *Attorney, Agent, or Firm* — General Electric Company; Pamela A. Kachur

(57) ABSTRACT

A method for repairing a degraded bolt hole in a casing flange by reaming and removing at least some corrosion on an inside and around the hole to form a reamed hole, mounting the flange to float relative to upper and lower electrodes of a welding machine, radially and axially clamping an area of the flange surrounding the reamed hole, placing upper and lower filler slugs in the reamed hole, placing the electrodes against upper and lower filler slugs and applying a welding current through the electrodes while applying pressure to the filler slugs with the electrodes and resistively heating and melting the filler slugs to form a weldment, and pulsing the welding current on and off. Pulsing may be performed with progressively increasing amounts of current. In situ tempering under the pressure of the electrodes may be performed on a substantially liquid pool formed by the welding current.

28 Claims, 9 Drawing Sheets

(56) References Cited

U.S. PATENT DOCUMENTS

| | | | | |
|---|---|---|---|---|
| 2,155,412 A | * | 4/1939 | Eckman | 219/86.21 |
| 2,394,535 A | * | 2/1946 | Dawson | 219/113 |
| 2,464,981 A | * | 3/1949 | Leathers et al. | 219/111 |
| 2,712,585 A | * | 7/1955 | Domeny | 219/89 |
| 2,859,339 A | * | 11/1958 | Brady | 327/392 |
| 2,908,801 A | * | 10/1959 | Cresswell | 219/74 |
| 3,265,852 A | * | 8/1966 | Laws et al. | 219/80 |
| 3,366,773 A | * | 1/1968 | Edge et al. | 219/127 |
| 3,453,152 A | * | 7/1969 | Hill et al. | 148/621 |
| 3,511,963 A | * | 5/1970 | Chmiel | 219/120 |
| 3,643,057 A | * | 2/1972 | Becker | 219/91.21 |
| 3,666,912 A | * | 5/1972 | Anderson et al. | 219/78.02 |
| 3,740,820 A | * | 6/1973 | Tarves, Jr. | 29/890.031 |
| 3,778,583 A | * | 12/1973 | Becker | 219/91.21 |
| 3,781,511 A | * | 12/1973 | Rygiol | 219/137 R |
| 4,037,073 A | * | 7/1977 | Becker | 219/92 |
| 4,205,221 A | * | 5/1980 | Meyer | 219/230 |
| 4,414,455 A | * | 11/1983 | Schneider et al. | 219/64 |
| 4,519,732 A | * | 5/1985 | Sutcliffe | 408/1 R |
| 4,564,735 A | * | 1/1986 | Dufrenne | 219/110 |
| 4,673,122 A | * | 6/1987 | Dubey | 228/119 |
| 4,953,777 A | * | 9/1990 | Griffith et al. | 228/119 |
| 4,994,646 A | * | 2/1991 | Tabata et al. | 219/130.51 |
| 5,021,627 A | * | 6/1991 | Bersch et al. | 219/119 |
| 5,066,845 A | * | 11/1991 | Anderson | 219/119 |
| 5,111,570 A | * | 5/1992 | Baumgarten et al. | 29/402.13 |
| 5,944,922 A | * | 8/1999 | Kadoya et al. | 148/325 |
| 6,107,595 A | * | 8/2000 | Peterson | 219/118 |
| 6,637,986 B2 | * | 10/2003 | Powell | 408/1 R |
| 7,126,076 B2 | * | 10/2006 | Workman et al. | 219/117.1 |
| 7,126,079 B2 | * | 10/2006 | Trewiler et al. | 219/117.1 |
| 7,141,754 B2 | * | 11/2006 | Workman et al. | 219/117.1 |
| 7,244,320 B2 | * | 7/2007 | Malley et al. | 148/419 |
| 7,256,368 B2 | * | 8/2007 | Artelsmair et al. | 219/130.51 |
| 7,552,855 B2 | * | 6/2009 | Vargas et al. | 228/119 |
| 7,662,244 B2 | * | 2/2010 | Yoshizawa et al. | 148/325 |
| 7,802,350 B2 | | 9/2010 | Walker | |
| 8,230,569 B2 | * | 7/2012 | Anantharaman et al. | 29/402.11 |
| 8,367,964 B2 | * | 2/2013 | Sullivan et al. | 219/117.1 |
| 2003/0038118 A1 | * | 2/2003 | Sun et al. | 219/117.1 |
| 2003/0222054 A1 | * | 12/2003 | Katou et al. | 219/86.9 |
| 2004/0169017 A1 | * | 9/2004 | Sakoda | 219/98 |
| 2005/0000947 A1 | * | 1/2005 | Sigler | 219/118 |
| 2005/0045597 A1 | * | 3/2005 | Wang et al. | 219/110 |
| 2005/0173492 A1 | * | 8/2005 | Workman et al. | 228/101 |
| 2005/0173493 A1 | * | 8/2005 | Workman et al. | 228/101 |
| 2005/0184031 A1 | * | 8/2005 | Sun et al. | 219/117.1 |
| 2006/0117562 A1 | * | 6/2006 | Subramanian et al. | 29/889.1 |
| 2007/0084906 A1 | * | 4/2007 | Vargas et al. | 228/119 |
| 2007/0175015 A1 | * | 8/2007 | Ainsworth | 29/524.1 |
| 2009/0083957 A1 | * | 4/2009 | Garrett | 29/23.51 |
| 2009/0250439 A1 | * | 10/2009 | Workman et al. | 219/78.02 |
| 2009/0250441 A1 | * | 10/2009 | Sullivan et al. | 219/117.1 |
| 2010/0024311 A1 | * | 2/2010 | Wambeke et al. | 52/40 |
| 2010/0032415 A1 | * | 2/2010 | Sullivan et al. | 219/117.1 |
| 2010/0158626 A1 | * | 6/2010 | Nakahata et al. | 408/230 |
| 2010/0178121 A1 | * | 7/2010 | Kondoh et al. | 408/1 R |
| 2010/0183431 A1 | * | 7/2010 | Anantharaman et al. | 415/182.1 |
| 2010/0243614 A1 | * | 9/2010 | Bunting et al. | 219/117.1 |
| 2011/0073572 A1 | * | 3/2011 | Wang et al. | 219/91.2 |
| 2011/0076147 A1 | * | 3/2011 | Ganesh et al. | 416/204 R |
| 2011/0272384 A1 | * | 11/2011 | Matsushita et al. | 219/91.2 |

OTHER PUBLICATIONS

PCT Search Report and Written Opinion dated Nov. 5, 2012 from corresponding Application No. PCT/US2012/048501.

* cited by examiner

RESISTANCE WELD REPAIRING OF CASING FLANGE HOLES

BACKGROUND OF THE INVENTION

1. Field of the Invention

This application relates generally to repair of flange holes and, more particularly, to methods for repairing holes in flanges of gas turbine engine casings.

2. Description of Related Art

Because engine casing flanges are made to stringent dimensional requirements in terms of I.D. and O.D. dimensions, flatness and hole location, and materials/mechanical performance requirements, the heat input and during the repair and resultant distortion needs to be controlled to prevent flange distortion or a degradation in material microstructure around holes in the flange and mechanical performance.

Casing holes can become oversized in service due to wear or corrosion. Restoration of the inside diameter of small diameter holes is difficult to achieve with conventional fusion welding processes due to weld distortion and mechanical property degradation. One particular type of corrosion is corrosion pitting which has been found in gas turbine engine compressor casing flange bolt holes.

There is, thus, a need for resistance weld repair of casing flange holes that avoids fusion discontinuities and excessive distortion. There is also a need for a weld repair of casing flange holes that minimizes weld distortion while optimizing the microstructure in the repair area to enhance mechanical performance of the flange around the hole.

SUMMARY OF THE INVENTION

A method for repairing at least one degraded bolt hole in a metallic casing flange having first and second sides using resistance welding includes: a) reaming or cleaning and removing at least some corrosion on an inside and around the bolt hole to form a reamed hole; b) mounting the metallic casing flange so that the metallic casing flange floats relative to upper and lower electrodes of a welding machine; c) radially and axially clamping an area of the flange surrounding the reamed hole; d) placing upper and lower filler slugs in the reamed hole; e) placing the upper and lower electrodes against the upper and lower filler slugs and applying a welding current through the upper and lower electrodes while applying pressure forces to the upper and lower filler slugs with the upper and lower electrodes and resistively heating and melting the upper and lower filler slugs respectively to form a weldment; and f) the applying welding current includes pulsing the welding current on and off a first number of cycles.

The method may further include cooling to solidification or cooling to solidification and then in situ tempering a substantially liquid pool formed by the welding current under the pressure of the upper and lower electrodes.

The pulsing may be performed with progressively increasing amounts of current for successive ones of the first number of cycles. The in situ tempering may include applying a tempering current through the upper and lower electrodes and pulsing the tempering current on and off a second number of cycles wherein the tempering current is substantially lower than the welding current.

The pulsing of the welding may be immediately followed by the in situ tempering wherein the tempering current is held substantially constant during the second number of cycles and cooling and solidification of the substantially liquid pool occurs after the first number of cycles. A new bolt hole may be drilled in the weldment.

Boron may be placed between the upper and lower filler slugs and the flange before placing the upper and lower electrodes against the upper and lower filler slugs and applying the welding current.

The resistive heating and melting of the upper and lower filler slugs may be thermally controlled to avoid formation of retained austenite in the solidified liquid pool. The thermally controlling may include maintaining temperature of the substantially liquid pool below a peak temperature at which retained austenite forms in the solidified liquid pool. The upper and lower electrodes may be cooled with water and water temperature may be controlled.

Degraded bolt holes in a metallic flange of a metallic casing may also be repaired using resistance welding first reaming or cleaning and removing at least some corrosion on insides and around degraded bolt holes to form reamed holes and mounting the casing on a rotatable table of or associated with a resistance welding machine so that the metallic casing flange floats relative to upper and lower electrodes of a welding machine. Next, an area of the flange surrounding one of the reamed holes is radially and axially clamped and upper and lower filler slugs are placed in the reamed hole and the weldment is formed as explained above. Weldments are formed in each of the reamed holes using the rotatable table to position each of the reamed holes with respect to the upper and lower electrodes.

A welding arrangement for performing repairs of degraded bolt holes in a metallic flange of a metallic casing includes the casing mounted on a rotatable table of or associated with a resistance welding machine, the casing fixtured in a floating fixture mounted on the table so that the metallic casing flange of the casing floats relative to upper and lower electrodes of the welding machine, radial and axial clamps radially and axially clamping respectively an area of the flange surrounding a reamed hole, upper and lower filler slugs disposed in the reamed hole, upper and lower electrodes against the upper and lower filler slugs, the resistance welding machine operable for applying a welding current through the upper and lower electrodes while applying pressure forced P to the upper and lower filler slugs with the upper and lower electrodes, the resistance welding machine operable for resistively heating and melting the upper and lower filler slugs respectively to form a weldment, and the resistance welding machine operable for pulsing the welding current on and off a first number of cycles.

The resistance welding machine may be operable for cooling to solidification and then in situ tempering a substantially liquid pool formed by the welding current under pressure of the upper and lower electrodes. The resistance welding machine may be operable for progressively increasing amounts of current for successive ones of the first number of cycles. The radial and axial clamps may be mounted on a clamp fixture rotatably fixtured on the flange and rotatable about an axis of the table and the casing centerline.

The resistance welding machine may be operable for cooling to solidification and in situ tempering a substantially liquid pool formed by the welding current under the pressure of the upper and lower electrodes, and for progressively increasing amounts of current for successive ones of the first number of cycles, and for applying a tempering current through the upper and lower electrodes and pulsing the tempering current on and off a second number of cycles during the in situ tempering, and wherein the tempering current is substantially lower than the welding current.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
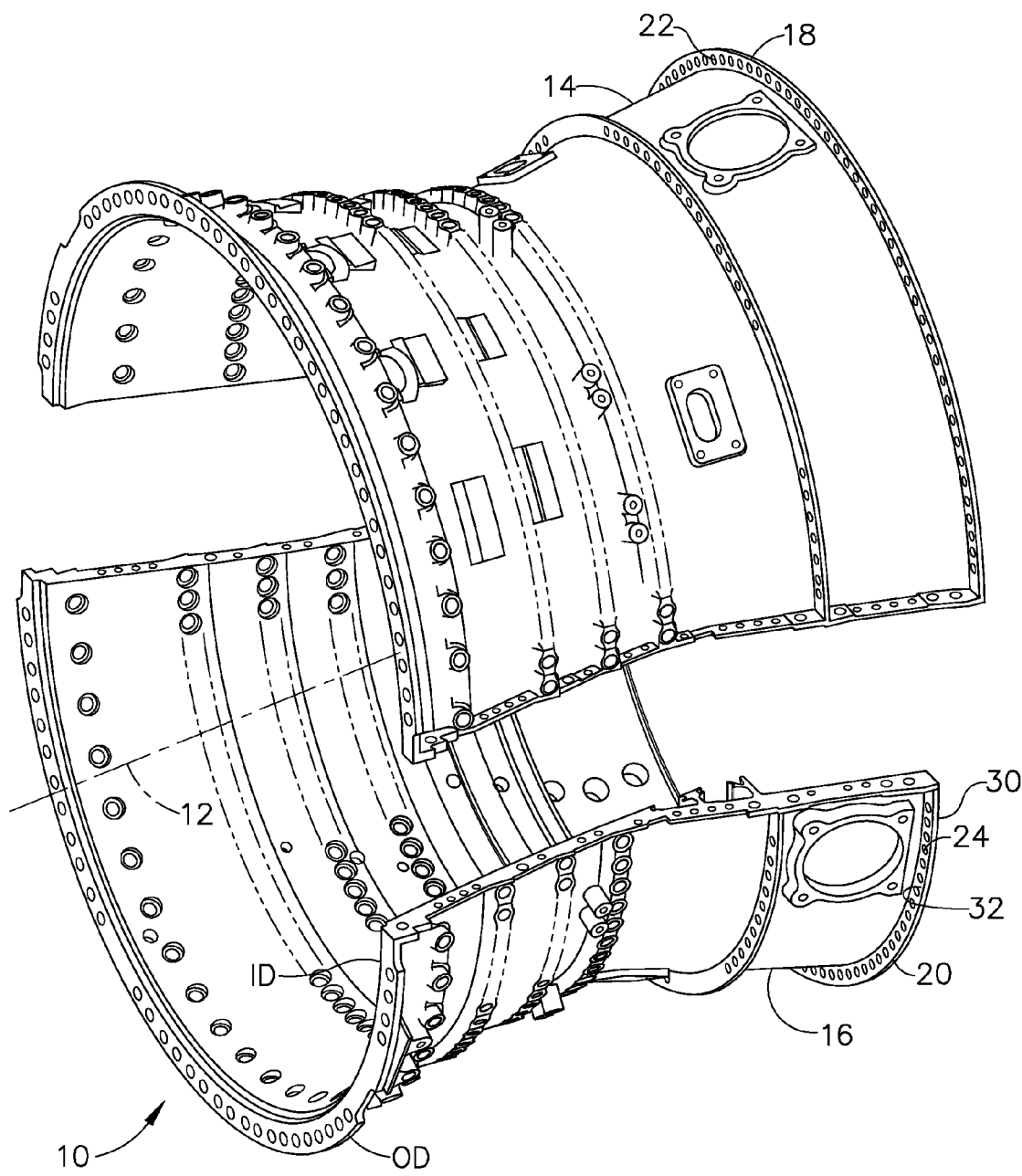
FIG. 1 is a perspective view illustration of two halves of a gas turbine engine split compressor casing with flange bolt holes that are degraded due to wear or corrosion.

Illustrated in FIG. 1 is an exemplary turbofan gas turbine engine split compressor casing 10 circumscribed about a casing centerline 12. The compressor casing 10 includes upper and lower casing halves 14, 16 having upper and lower casing flanges 18, 20 respectively. Flange bolt holes 22 are disposed through the upper and lower casing flanges 18, 20. At least some of the bolt holes 22 are degraded, typically, due to wear or corrosion.

Figure 2:
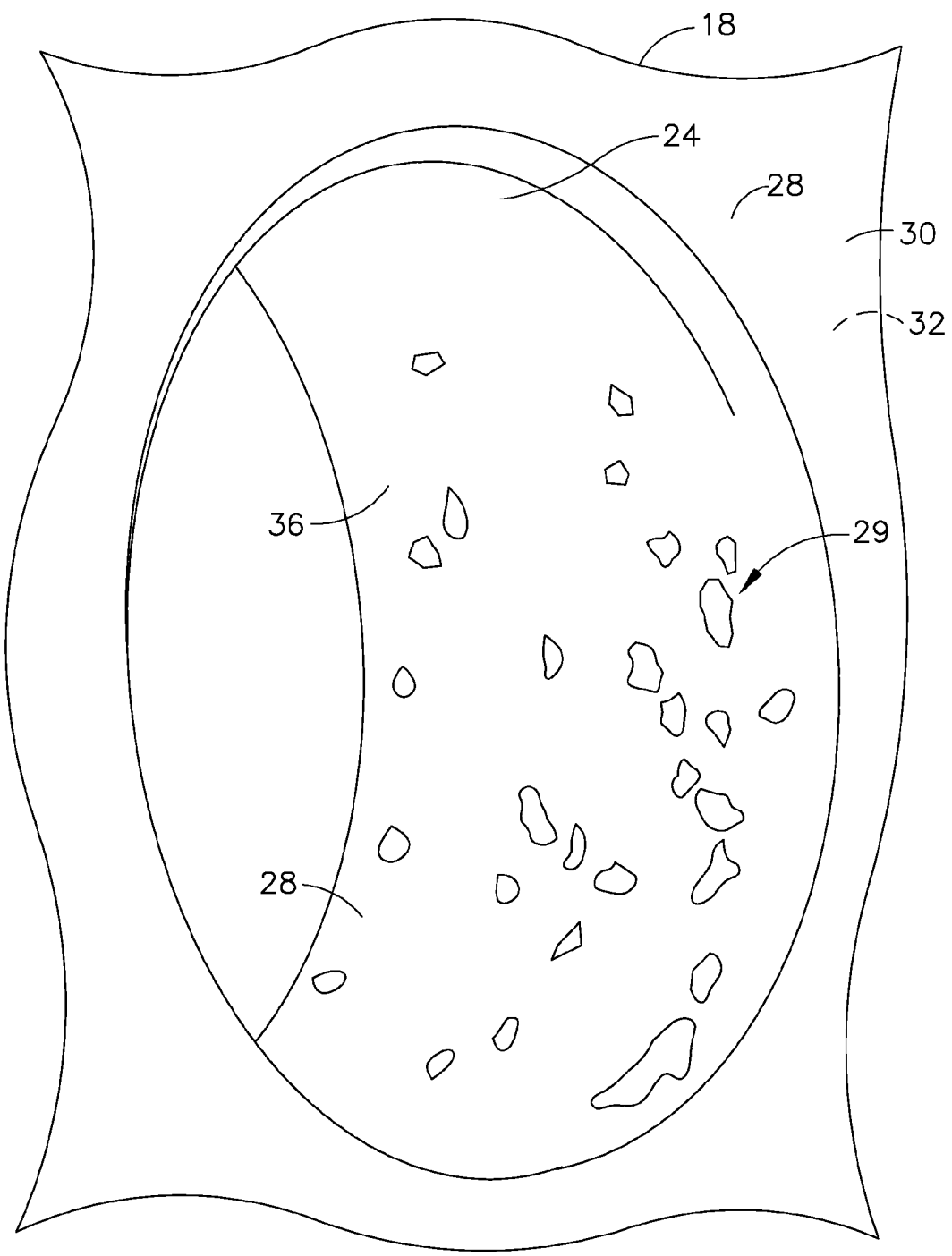
FIG. 2 is a perspective view illustration of one of the degraded flange bolt holes illustrated in FIG. 1.

Illustrated in FIG. 2 is an exemplary degraded bolt hole 24 through one of the upper or lower casing flanges 18, 20 having pits 26 indicating degradation due to wear and/or corrosion. Degraded surface areas 28 within the degraded bolt hole 24 and on first and second sides 30, 32 of flange 18 are indicated by pitting 29. A method for repairing the damaged or degraded bolt hole 24 as disclosed herein and outlined in FIGS. 3 and 4, removes degraded material 34 on an inside 36 of and around the degraded bolt hole 24 on the first and second sides 30, 32 of the flange 18 as indicated in FIG. 3.

Figure 3:
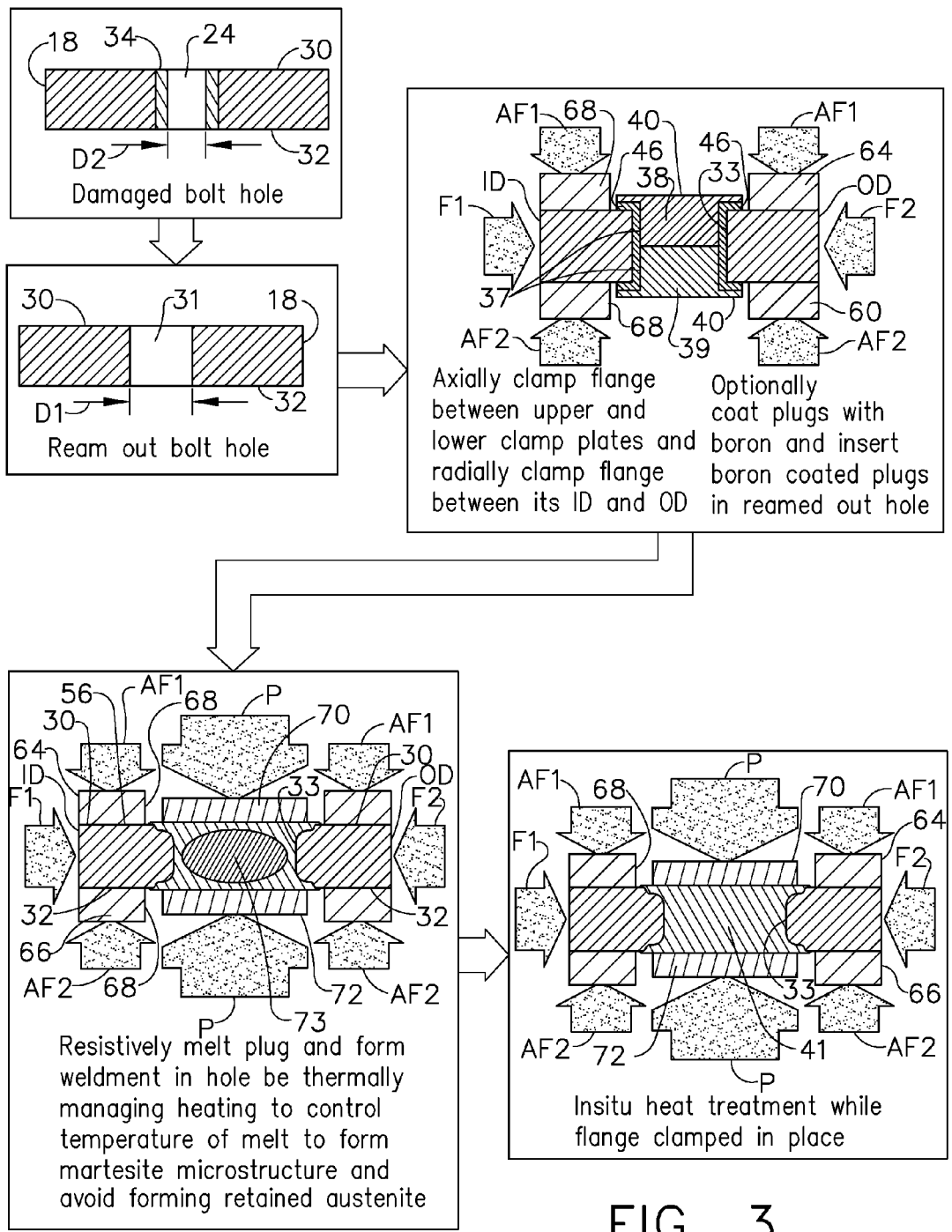
FIG. 3 is a diagrammatical illustration of a method for repairing the degraded flange bolt hole illustrated in FIG. 2.
Figure 4:
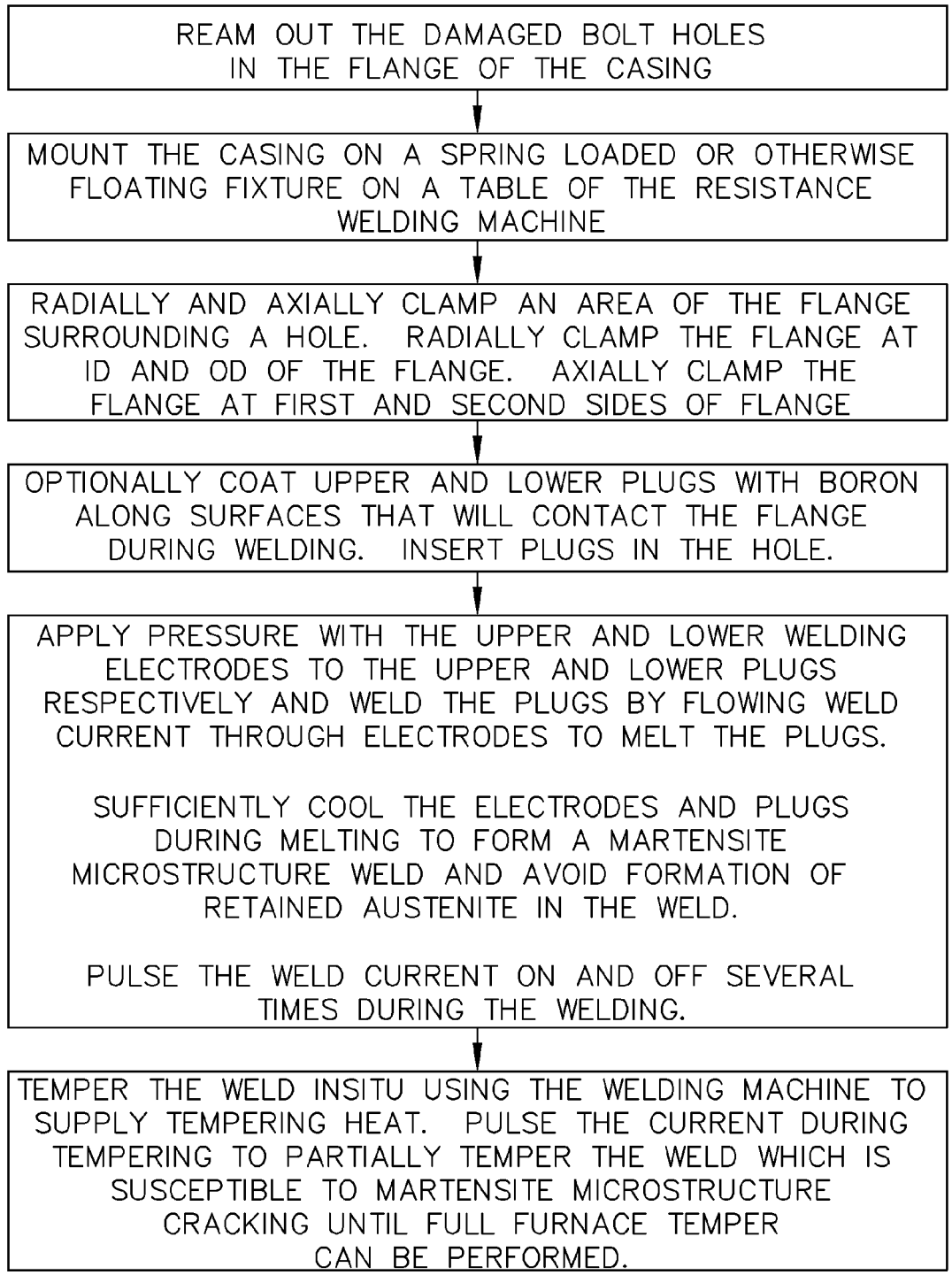
FIG. 4 is a flow chart illustration of the method for repairing the degraded flange bolt hole illustrated in FIG. 3.
Figure 5:
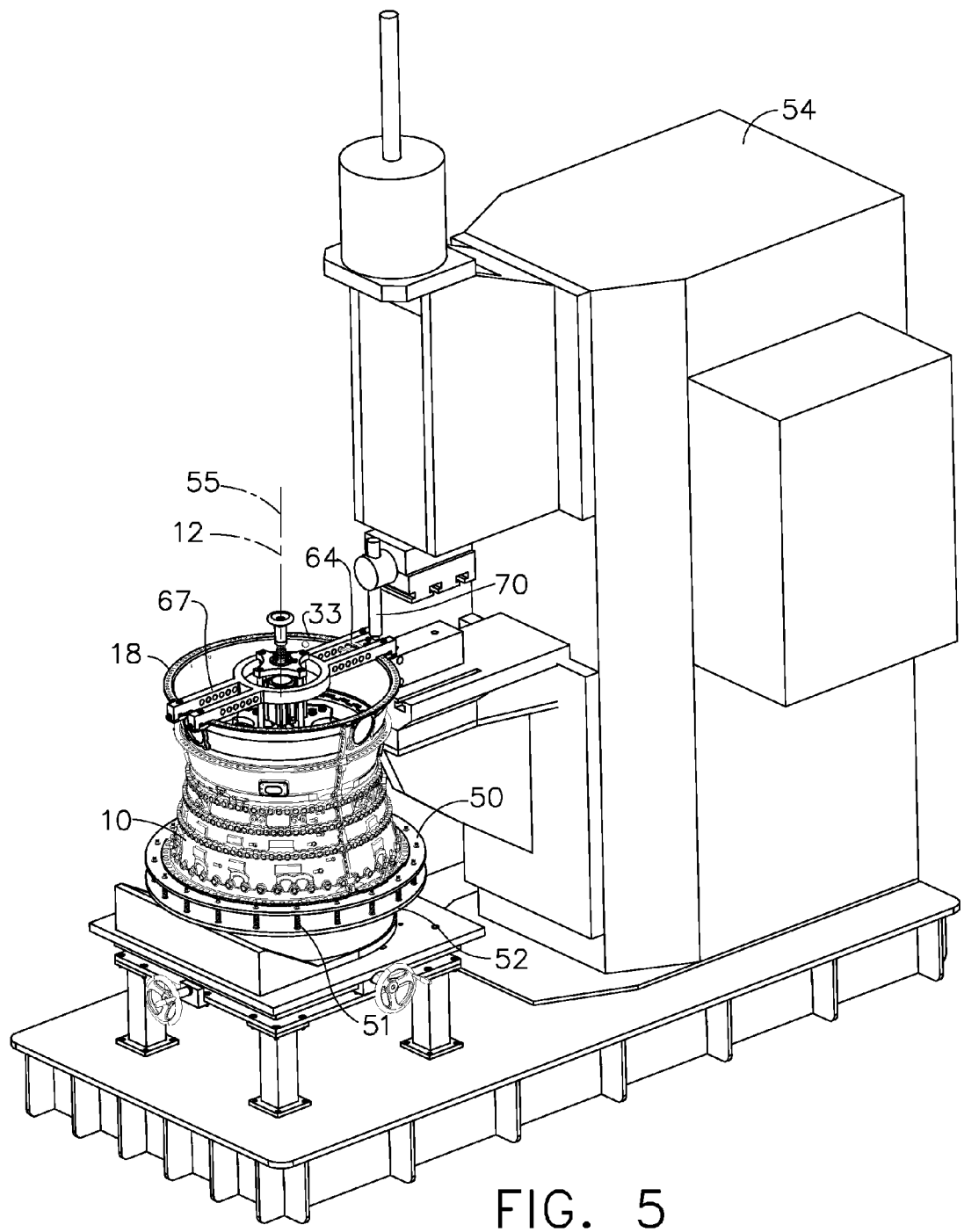
FIG. 5 is a perspective view illustration of an exemplary welding machine for the method for repairing the degraded flange bolt hole.
Figure 6:
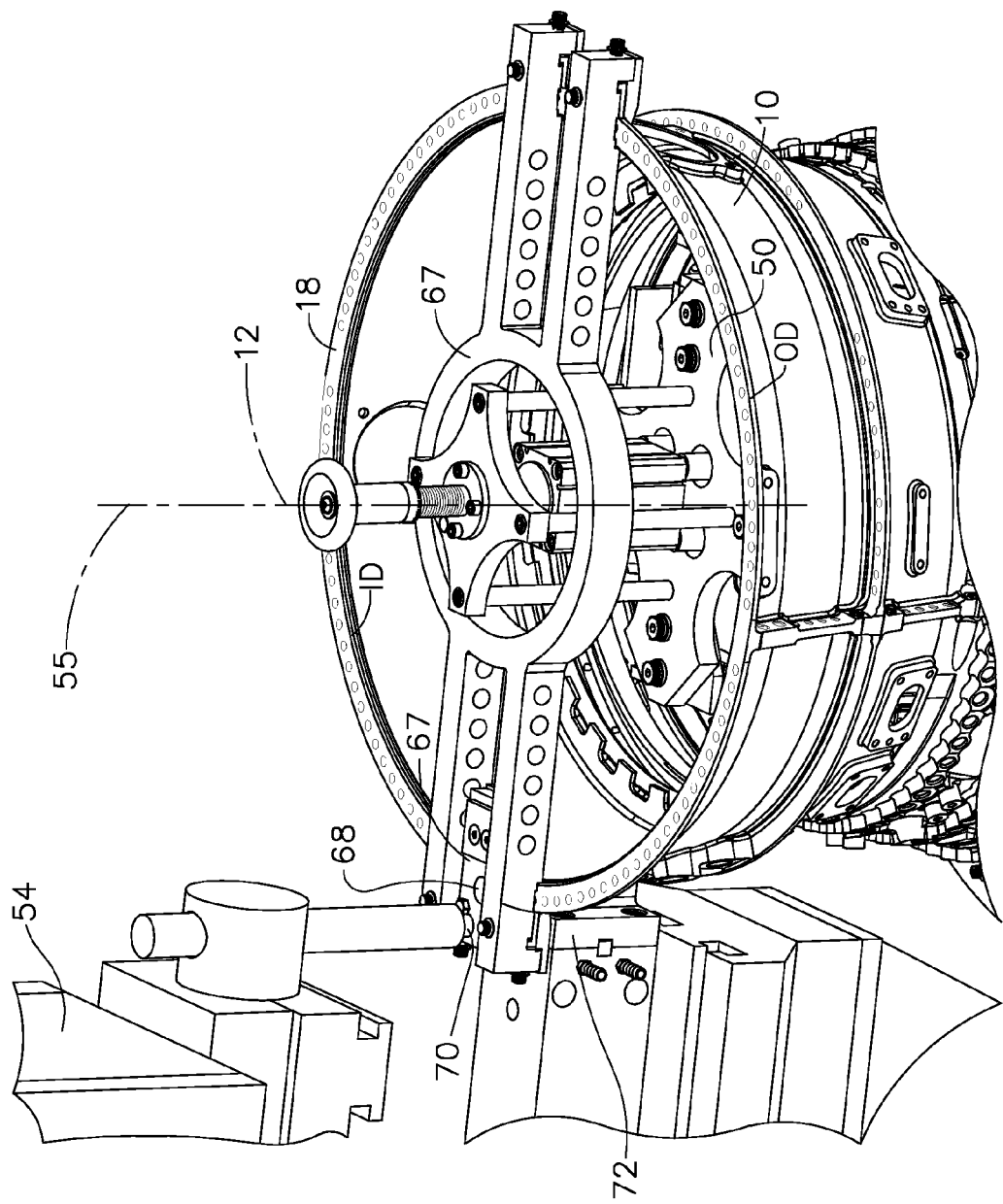
FIG. 6 is a perspective view illustration of a clamping fixture for use on the casing illustrated in FIG. 4.
Figure 7:
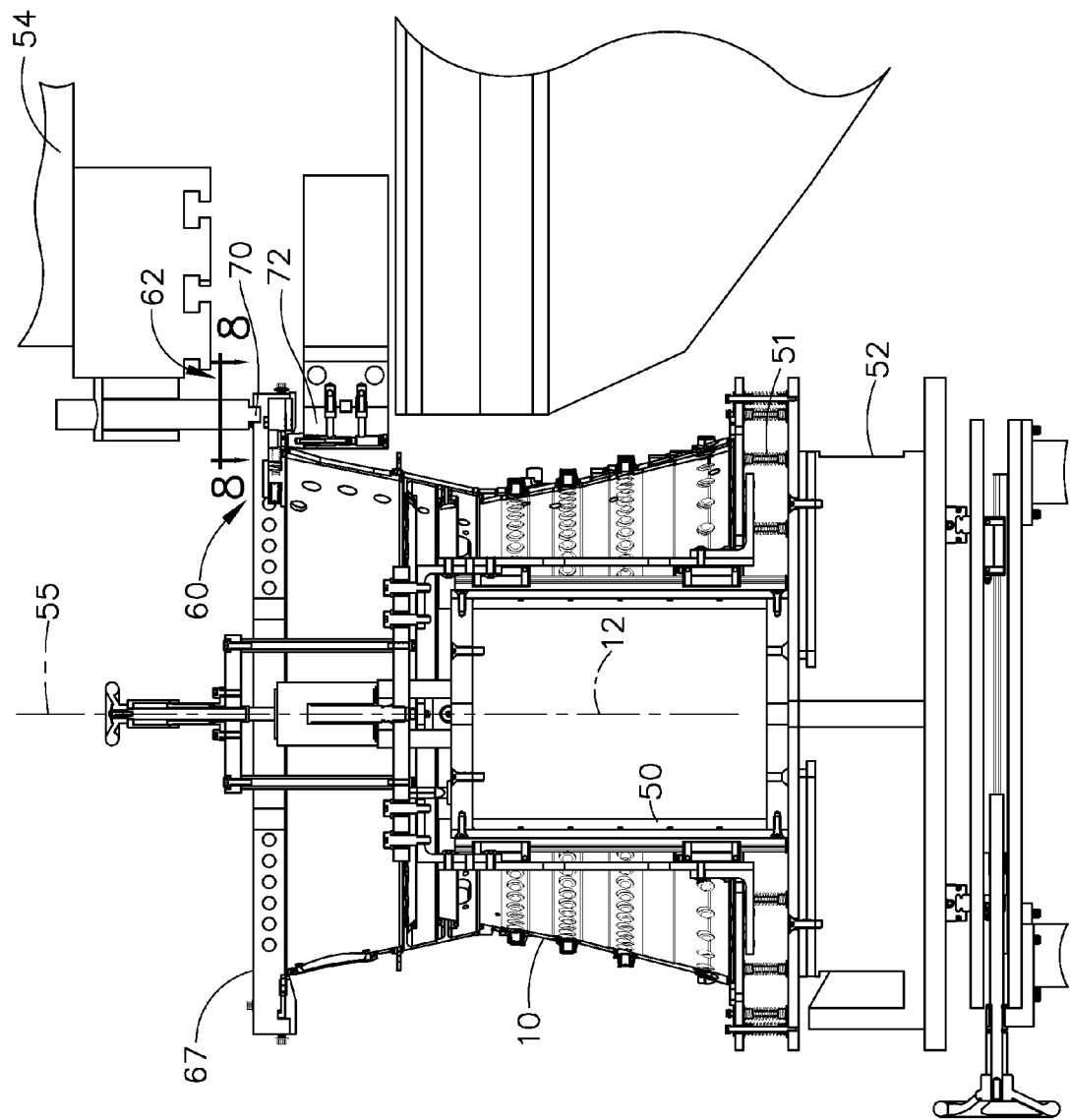
FIG. 7 is a partially perspective partially cross-sectional view illustration of the casing and welding electrodes of the welding machine illustrated in FIG. 6.

Illustrated in FIGS. 3 and 4 is an exemplary method of repairing the degraded bolt hole 24 using resistance welding. The method includes cleaning and removing at least some of the corrosion or degraded material 34 on the inside 36 and around the degraded bolt hole 24 such as by reaming the bolt hole. An exemplary reaming step includes reaming the cylindrical degraded bolt hole 24 to form a reamed hole 33 having a reamed out diameter D1=0.385 inches corresponding as compared to a new undamaged bolt hole having an original design diameter D2=0.345 inches. One or more or all the bolt holes in the flange may have the degraded material 34 be removed before using resistance welding and heating to fill the reamed holes 33 with weldments 41. After the weldment and tempering of the weldment is completed, a new bolt hole with the original design or other diameter is drilled.

Figure 8:
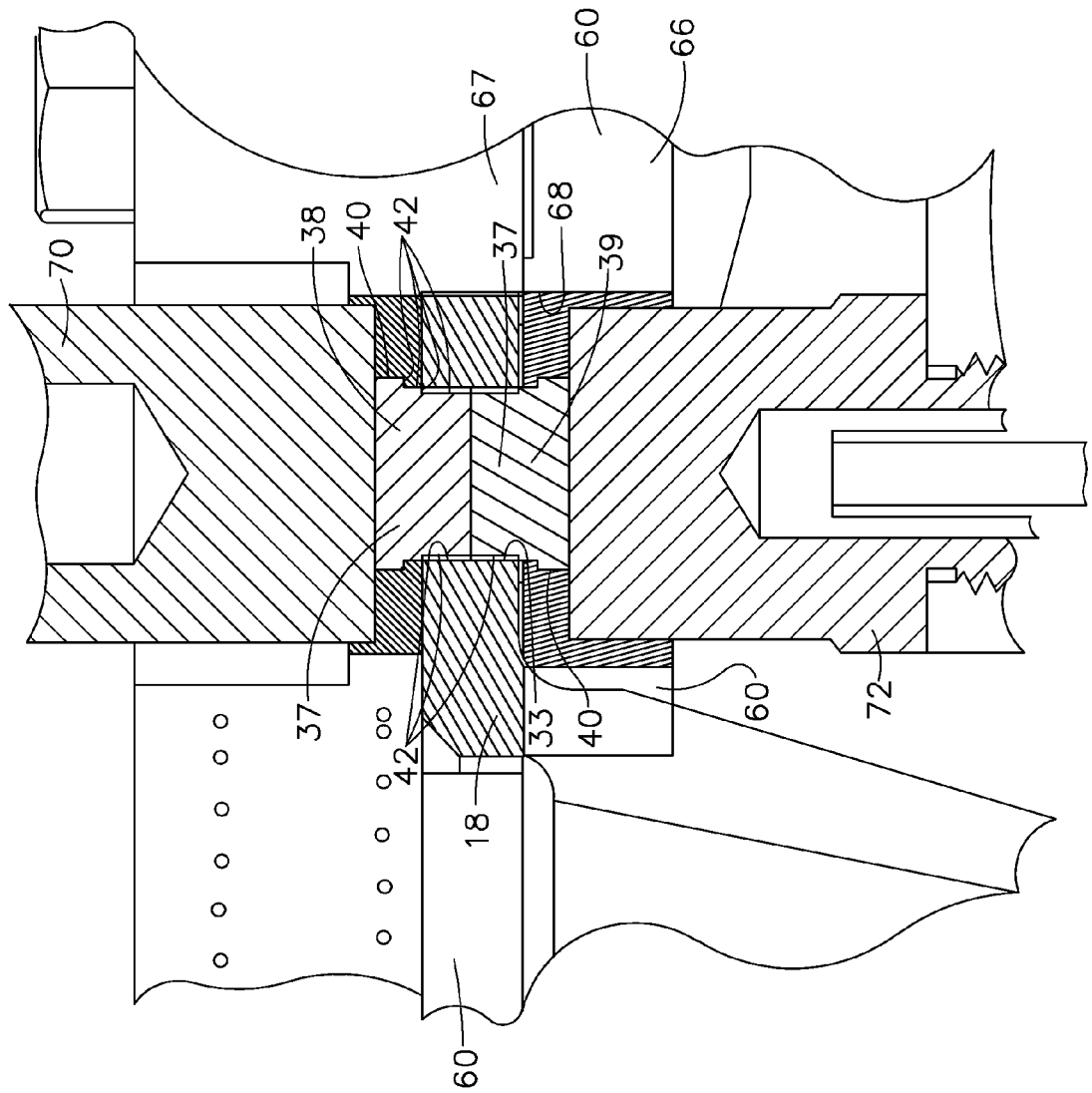
FIG. 8 is a cross-sectional view illustration of the casing and welding electrodes of the welding machine illustrated in FIG. 7 taken through 8-8 in FIG. 7.
Figure 9:
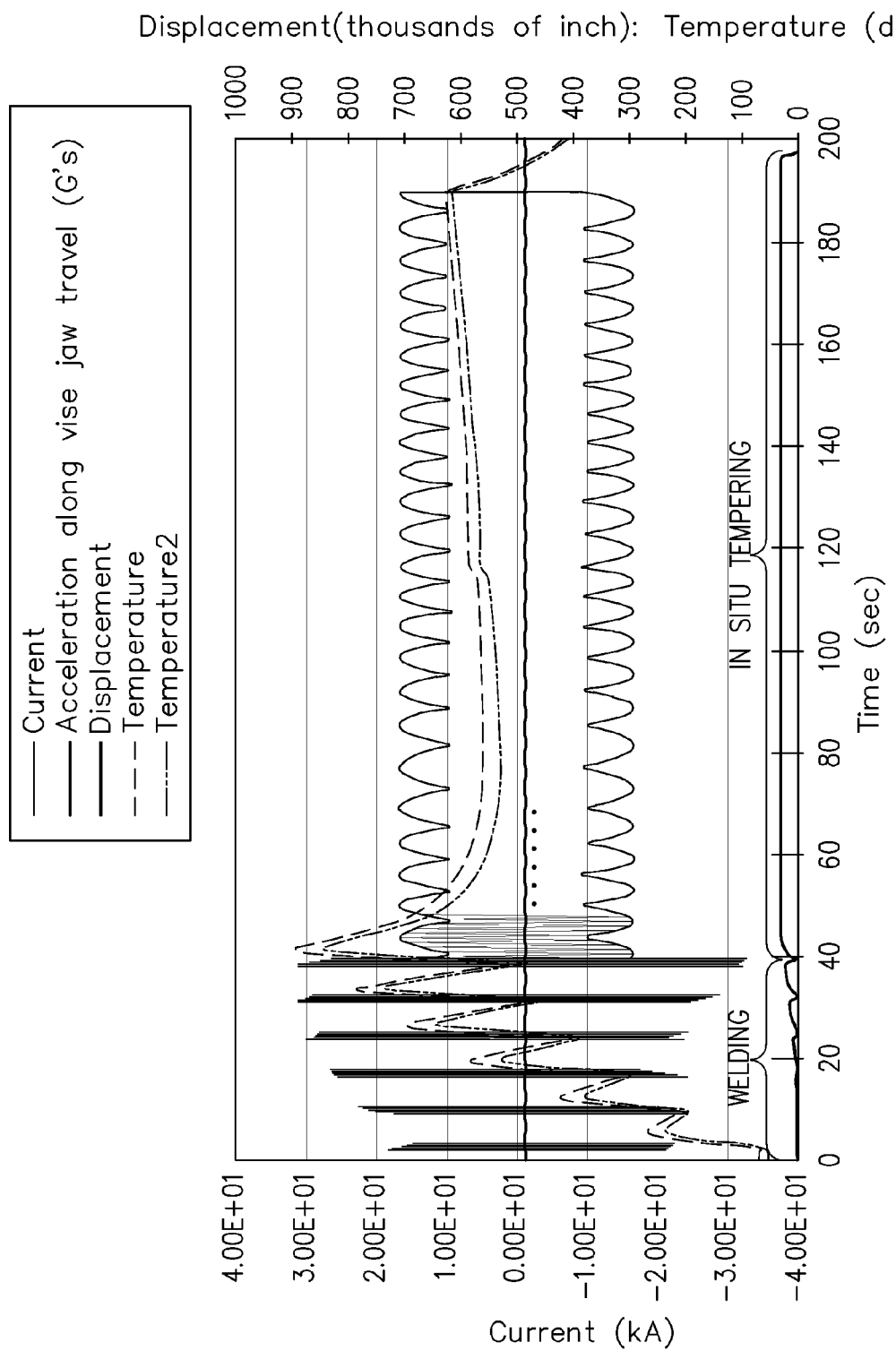
FIG. 9 is a graphical illustration of pulsing current during the repair method outlined in FIG. 4.

As further illustrated in FIGS. 3, 5, 6 and 8, after the one or more reamed holes 33 have been formed in the flange 18, the compressor casing 10 is mounted on a spring loaded or otherwise floating fixture 50 supported by springs 51 on a rotatable table 52 of or associated with a resistance welding machine 54. The casing 10 is mounted on the table 52 so that an axis 55 of the table 52 is collinear with the casing centerline 12. The casing 10 is floated or spring loaded so that during welding and heat treatment steps pressure forces P are applied evenly during both steps by upper and lower electrodes 70, 72. The floating provides an even application of pressure or pressure distribution between the upper and lower electrodes 70, 72 of the welding machine 54. The springs allow the case flange to float relative to the upper and lower electrodes 70, 72 (illustrated in more detail in FIG. 8). This prevents warping as upper and lower filler slugs 38, 39 collapse during welding to form the weldment 41 because of the pressure from the pressure forces P applied by the upper and lower electrodes 70, 72. This also allows use of lower cost conventional resistance welding machine. The collapse during welding is illustrated in FIG. 9 by the measured Displacement and Acceleration along vice jaw travel of the upper and lower electrodes 70, 72.

An area 56 of the flange 18 surrounding the reamed hole 33 is radially and axially clamped by radial and axial clamps 60, 62. The radial clamp 60 clamps inside and outside diameters ID, OD of the flange 18 with radially outwardly and inwardly clamping forces F1 and F2 respectively as illustrated in FIG. 3. The axial clamp 62 clamps the first and second sides 30, 32 of flange 18 between constraint tool base 64 and constraint clamp 66 respectively with first and second axial clamping forces AF1 and AF2 respectively. The constraint tool base 64 and the constraint clamp 66 include clamp holes 68 to allow upper and lower electrodes 70, 72 to pass through the constraint tool base 64 and the constraint clamp 66 to contact and apply pressure to the upper and lower filler slugs 38, 39 used to form a weldment 41 in the reamed hole 33.

The clamps constrain the flange to prevent edge bulge and out of plane warping of the flange 18 during welding. The radial and axial clamps 60, 62 are mounted on a clamp fixture 67 that is rotatably fixtured on the flange 18 and rotatable about the axis 55 of the table 52 and the casing centerline 12.

The consumable upper and lower filler slugs 38, 39 include cylindrical sections 37 attached to caps or retaining lips 40. The upper and lower filler slugs 38, 39 are made from the same metal as the casing flanges. The upper and lower filler slugs 38, 39 are placed in the reamed hole 33. Optionally, a coating or layer of Boron 46 may be disposed between the cylindrical sections 37 and the metal of the flange 18 and between the retaining lips 40 and the metal of the flange 18. As illustrated herein, the Boron 46 may be applied to contact surfaces 42 of first and second filler slugs 38, 39 that contact the metal of the flange 18 before the plugs are placed in the reamed hole. In the exemplary welding method illustrated herein, a layer of Boron about 0.0002 inches thick is used. The Boron suppresses the melting point of the metal of the plugs.

Resistance welding is then performed by applying welding current through the upper and lower electrodes 70, 72 to melt the upper and lower filler slugs 38, 39 respectively while applying a pressure force P with the electrodes to the upper and lower filler slugs 38, 39 to form the weldment in the reamed hole 33. The resistance welding is thermally controlled by thermally controlling the electrodes. Resistive heating of the upper and lower filler slugs 38, 39 and the a portion of the flange 18 around the reamed hole 33 produced by the welding current results in coalescence in a substantially liquid pool 73 (see FIG. 3) that substantially fills the reamed hole 33. The upper and lower electrodes 70, 72 are then used to apply pressure with pressure forces P to the substantially liquid pool during cooling and/or in situ heat treatment or tempering.

One thermal control method is controlling cooling water temperature of water used to cool the upper and lower electrodes 70, 72 during the resistance welding step. Electrical current passing through the upper and lower electrodes 70, 72 is pulsed during the resistance welding step. Pulse time (number of cycles, 1 second=60 cycles for US power supply) and cooling time between pulses are two parameters used to control pulsing the welding current on and off. Another thermal control method is controlling the welding current passing through the electrodes.

The amount of pressure applied with the electrodes to the upper and lower filler slugs 38, 39 is also controlled during the resistance welding step. Electrode material is important for good weld properties and a bimetallic material made of copper and tungsten (Cu—W) is an exemplary material suitable for the resistance welding step.

The resistance heating provided by the welding machine is controlled and limited by the temperature of the weld which is held to a peak temperature that avoids the formation of retained austenite in the corners of the weldment. The peak temperature is below the eutectoid temperature for the steel of the casing. Martensite is the desired microstructure of the weldment. The exemplary material used for the casing and flanges is M152 stainless steel having a peak temperature somewhere around its melting point which is about 2500 degrees Fahrenheit or higher. After welding, the weldment is heat treated or tempered by heating the weldment at a substantially lower temperature illustrated herein as in a range of about 1000-1200 degrees Fahrenheit.

FIG. 9 graphically illustrates an exemplary method including welding and in-situ heat treatment or tempering. FIG. 8 represents measured results and parameters from a development test of the method. The pulsing of the current on and off as illustrated includes 6 pulses each at a progressively higher or increased current to better control weld nugget growth (melting) and prevent surface expulsion due to fit-up tolerance variation between the plugs and the hole. This progressively heats up the plugs as indicated by the temperature curves T1 and T2 until they melt and form the weldment. The pulsing also allows the weld nugget to cool between pulses which prevents or reduces retained austenite formation. The temperature curves T1 and T2 are used only to indicate the heating and the actual temperatures in the pool and weldment are much higher. The thermocouples were not close enough to the weldment area inside the hole to measure actual temperature of the pool and weldment.

T1 was measured by a first thermocouple located on the top side of the weld near an outer diameter of the upper electrode on the top side of the flange. Its location should have been at the outer edge of the heat affect zone and is not in the actual nugget, thus, indicating lower readings in the range of about 500 to 600 degrees Fahrenheit. T2 was measured by a second thermocouple located on the bottom side of the weld near an outer diameter of the lower electrode on the bottom side of the flange. Its location should have been at the outer edge of the heat affect zone and is not in the actual nugget or pool, thus, indicating lower readings in the range of about 500 to 600 degrees Fahrenheit. The differences in T1 and T2 are probably due to proximity of the thermocouples to the weld (these are hard to accurately align and still clamp the parts).

When Boron is applied to the contact surfaces 42 of first and second filler slugs 38, 39 instead of getting melting in center and growing a nugget at high welding current, a reduced welding current is used. The welding time is extended and the heat from the hotter center is conducted to the interface between the edge of the hole and the plug causing localized melting due to the presence of the boron which is a melting point suppressant. For example, the welding current may be reduced from about 18-20 kiloamperes (kA) to about 7-8 kiloamperes. As current continues to flow for a long period of time, boron diffuses into the base metal plug causing the locally melted area to solidify as the concentration of boron decreases.

Additionally excess material from the consumable upper and lower filler slugs 38, 39 and particularly the caps or retaining lips 40 may be removed after the welding and tempering. The excess material may be removed with a machine, such as a grinder, so that the first and second sides 30, 32 of the flange 18 are smooth and even. The new bolt hole may be then drilled or otherwise machined in the newly welded area so as to be consistent with the level of the adjoining flange material.

After the welding and in situ tempering is completed, the casing is placed in a furnace for a 6 hour long tempering cycle which is exemplary of a long term deep tempering either before or after the new bolt holes are drilled or machined into the flange. The nugget has already solidified and the microstructure has transformed to un-tempered martensite. The partial tempering of the martensite reduces the hardness in the weldment and prevents cold cracking while the part awaits other holes to be repaired. After the welding is completed, the casing is placed in a furnace for the 6 hour or long period tempering cycle.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. A method for repairing at least one degraded bolt hole in a metallic casing flange having first and second sides using resistance welding, the method comprising:
    a) reaming or cleaning and removing at least some corrosion on an inside and around the bolt hole to form a reamed hole;
    b) mounting the metallic casing flange so that the metallic casing flange floats relative to upper and lower electrodes of a welding machine;
    c) radially and axially clamping an area of the flange surrounding the reamed hole;
    d) placing upper and lower filler slugs in the reamed hole;
    e) placing the upper and lower electrodes against the upper and lower filler slugs and applying a welding current through the upper and lower electrodes while applying pressure to the upper and lower filler slugs with the upper and lower electrodes and resistively heating and melting the upper and lower filler slugs respectively to form a weldment; and
    f) the applying welding current includes pulsing the welding current on and off a first number of cycles.

2. The method of claim 1, further including cooling to solidification or cooling to solidification and then in situ tempering a substantially liquid pool formed by the welding current under the pressure of the upper and lower electrodes.

3. The method of claim 2, wherein the pulsing of the welding current is performed with progressively increasing amounts of current for successive ones of the first number of cycles.

4. The method of claim 1, further comprising:
cooling to solidification and in situ tempering a substantially liquid pool formed by the welding current under the pressure of the upper and lower electrodes,
the in situ tempering includes applying a tempering current through the upper and lower electrodes and pulsing the tempering current on and off a second number of cycles, and
wherein the tempering current is substantially lower than the welding current.

5. The method of claim 4, wherein the pulsing of the welding current is performed with progressively increasing amounts of current for successive ones of the first number of cycles and immediately followed by the in situ tempering wherein the tempering current is held substantially constant during the second number of cycles and cooling and solidification of the substantially liquid pool occurs after the first number of cycles.

6. The method of claim 5, further comprising drilling a new bolt hole in the weldment.

7. The method of claim 5, further comprising placing Boron between the upper and lower filler slugs and the flange before placing the upper and lower electrodes against the upper and lower filler slugs and applying the welding current.

8. The method of claim 7, further comprising drilling a new bolt hole in the weldment.

9. The method of claim 2, further including thermally controlling the resistive heating and melting of the upper and lower filler slugs to avoid formation of retained austenite in the solidified liquid pool.

10. The method of claim 9, wherein the pulsing of the welding current is performed with progressively increasing amounts of current for successive ones of the first number of cycles.

11. The method of claim 10, wherein the thermally controlling the resistive heating and melting includes maintaining temperature of the substantially liquid pool below a peak temperature at which retained austenite forms in the solidified liquid pool.

12. The method of claim 11, wherein the thermally controlling the resistive heating and melting includes cooling the upper and lower electrodes with water and controlling water temperature of the water.

13. The method of claim 12, further comprising drilling a new bolt hole in the weldment.

14. A method for repairing one or more degraded bolt holes in a metallic flange of a metallic casing, the flange having first and second sides using resistance welding, the method comprising the following steps:
a) reaming or cleaning and removing at least some corrosion on insides and around degraded bolt holes to form reamed holes;
b) mounting the casing on a rotatable table of or associated with a resistance welding machine and so that the metallic casing flange floats relative to upper and lower electrodes of a welding machine;
c) radially and axially clamping an area of the flange surrounding the reamed hole;
d) placing upper and lower filler slugs in the reamed hole;
e) placing the upper and lower electrodes against the upper and lower filler slugs and applying a welding current through the upper and lower electrodes while applying pressure to the upper and lower filler slugs with the upper and lower electrodes and resistively heating and melting the upper and lower filler slugs respectively to form a weldment;
f) the applying welding current includes pulsing the welding current on and off a first number of cycles; and
g) repeating steps c) through f) for each of the reamed holes using the rotatable table to position each of the reamed holes with respect to the upper and lower electrodes.

15. The method of claim 14, further including cooling to solidification or cooling to solidification and then in situ tempering a substantially liquid pool formed by the welding current under the pressure of the upper and lower electrodes after step f.

16. The method of claim 15, wherein the pulsing of the welding current is performed with progressively increasing amounts of current for successive ones of the first number of cycles.

17. The method of claim 15, further comprising:
cooling to solidification and in situ tempering a substantially liquid pool formed by the welding current under the pressure of the upper and lower electrodes after step f,
the in situ tempering includes applying a tempering current through the upper and lower electrodes and pulsing the tempering current on and off a second number of cycles, and
wherein the tempering current is substantially lower than the welding current.

18. The method of claim 17, wherein the pulsing of the welding current is performed with progressively increasing amounts of current for successive ones of the first number of cycles and immediately followed by the in situ tempering wherein the tempering current is held substantially constant during the second number of cycles and cooling and solidification of the substantially liquid pool occurs after the first number of cycles.

19. The method of claim 18, further comprising drilling new bolt holes in the weldments.

20. The method of claim 19, further comprising placing Boron between the upper and lower filler slugs and the flange before placing the upper and lower electrodes against the upper and lower filler slugs and applying the welding current.

21. The method of claim 17, further comprising:
thermally controlling the resistive heating and melting of the upper and lower filler slugs to avoid formation of retained austenite in the solidified liquid pool,
the pulsing of the welding current is performed with progressively increasing amounts of current for successive ones of the first number of cycles,
maintaining temperature of the substantially liquid pool below a peak temperature at which retained austenite forms in the solidified liquid pool, and
cooling the upper and lower electrodes with water and controlling water temperature of the water.

22. The method of claim 21, further comprising drilling new bolt holes in the weldments.

23. A welding arrangement for performing repairs of degraded bolt holes in a metallic flange of a metallic casing, the arrangement comprising:
a casing mounted on a rotatable table of or associated with a resistance welding machine,
the casing fixtured in a floating fixture mounted on the table so that the metallic casing flange of the casing floats relative to upper and lower electrodes of he welding machine, radial and axial clamps radially and axially clamping respectively an area of the flange surrounding a reamed hole, upper and lower filler slugs disposed in the reamed hole, upper and lower electrodes against the upper and lower filler slugs, the resistance welding machine operable for applying a welding current through the upper and lower electrodes while applying pressure to the upper and lower filler slugs with the upper and lower electrodes, the resistance welding machine operable for resistively heating and melting the upper and lower filler slugs respectively to form a weldment, and the resistance welding machine operable for pulsing the welding current on and off a first number of cycles.

24. The welding arrangement of claim 23, further including the resistance welding machine operable for cooling to solidification and then in situ tempering a substantially liquid pool formed by the welding current under pressure of the upper and lower electrodes.

25. The welding arrangement of claim 24, further including the resistance welding machine operable for progressively increasing amounts of current for successive ones of the first number of cycles.

26. The welding arrangement of claim 25, further comprising the radial and axial clamps mounted on a clamp fixture rotatably fixtured on the flange and rotatable about an axis of the table and the casing centerline.

27. The welding arrangement of claim 23, further comprising:

the resistance welding machine operable for cooling to solidification and in situ tempering a substantially liquid pool formed by the welding current under the pressure of the upper and lower electrodes, the resistance welding machine operable for progressively increasing amounts of current for successive ones of the first number of cycles, the resistance welding machine operable for applying a tempering current through the upper and lower electrodes and pulsing the tempering current on and off a second number of cycles during the in situ tempering, and wherein the tempering current is substantially lower than the welding current.

28. The welding arrangement of claim 27, further comprising the radial and axial clamps mounted on a clamp fixture rotatably fixtured on the flange and rotatable about an axis of the table and the casing centerline.

* * * * *

UNITED STATES PATENT AND TRADEMARK OFFICE
CERTIFICATE OF CORRECTION

| | | |
|---|---|---|
| PATENT NO. | : 8,895,887 B2 | Page 1 of 1 |
| APPLICATION NO. | : 13/204084 | |
| DATED | : November 25, 2014 | |
| INVENTOR(S) | : Trapp et al. | |

It is certified that error appears in the above-identified patent and that said Letters Patent is hereby corrected as shown below:

In The Drawings

In Fig. 3, Sheet 3 of 9, delete "martesite microstructure and" and insert -- martensite microstructure and --, therefor.

In The Specification

In Column 5, Line 30, delete "method" and insert -- pulsing for the repair method --, therefor.

In The Claims

In Column 8, Line 66, in Claim 23, delete "of he" and insert -- of the --, therefor.

Signed and Sealed this
Sixteenth Day of February, 2016

Michelle K. Lee
*Director of the United States Patent and Trademark Office*